United States Patent [19]

Hernandez et al.

[11] Patent Number: 5,404,082
[45] Date of Patent: Apr. 4, 1995

[54] HIGH FREQUENCY INVERTER WITH POWER-LINE-CONTROLLED FREQUENCY MODULATION

[75] Inventors: Adan F. Hernandez, Scarborough; Gert W. Bruning, No. Tarrytown, both of N.Y.

[73] Assignee: North American Philips Corporation, New York, N.Y.

[21] Appl. No.: 52,311

[22] Filed: Apr. 23, 1993

[51] Int. Cl.$^6$ ............................................. H05B 37/02
[52] U.S. Cl. ...................................... 315/219; 315/291; 315/307; 315/308; 315/337 R; 315/244
[58] Field of Search ................... 315/219, 307, DIG. 5, 315/DIG. 7, 308, 247, 291, 227 R, 244

[56] References Cited

U.S. PATENT DOCUMENTS

| | | | |
|---|---|---|---|
| 3,611,021 | 10/1971 | Wallace | 315/239 |
| 3,997,814 | 12/1976 | Toho | 315/227 R X |
| 4,277,728 | 7/1981 | Stevens | 315/308 X |
| 4,471,269 | 9/1984 | Ganser et al. | 315/307 |
| 4,682,082 | 7/1987 | MacAkill et al. | 315/219 |
| 4,782,268 | 11/1988 | Fahnrich et al. | 315/200 |
| 4,862,040 | 8/1989 | Nilssen | 315/244 |
| 4,873,471 | 10/1989 | Dean et al. | 315/308 |
| 5,001,400 | 3/1991 | Nilssen | 315/209 |

FOREIGN PATENT DOCUMENTS

9204808 3/1992 WIPO.

Primary Examiner—Robert J. Pascal
Assistant Examiner—Reginald A. Ratliff
Attorney, Agent, or Firm—David R. Treacy

[57] ABSTRACT

An electronic high frequency supply, such as a lamp ballast, having a full-wave rectifier, a storage capacitor charged to a voltage greater than the peak of the rectifier output, and an isolating diode between the rectifier and the storage capacitor. An inverter is connected to the storage capacitor, and has a high frequency inductive load circuit connected between the inverter output and a junction between the isolating diode and the bridge rectifier. A capacitor, connected to the junction in parallel with a series circuit formed by the isolating diode and storage capacitor, forms a high frequency resonance circuit with the inductive load circuit. Current is drawn from the rectifier only as a series of pulses at the inverter frequency. To minimize variation in the high frequency load current, the inverter frequency is varied linearly with but oppositely to the instantaneous value of the rectifier output voltage.

19 Claims, 4 Drawing Sheets

HIGH FREQUENCY INVERTER WITH POWER-LINE-CONTROLLED FREQUENCY MODULATION

CROSS-REFERENCE TO RELATED APPLICATIONS

This application is related to the subject matter of concurrently-filed application Ser. No. 08/052,312, filed by Charles B. Mattas for LAMP BALLAST WITH FREQUENCY MODULATED LAMP FREQUENCY.

BACKGROUND OF THE INVENTION

1. Field of the Invention

The invention relates to the field of electronic power supplies energized from an AC line, which are desired to operate with low line current distortion; and more particularly to such supplies in which a high frequency is generated for supplying a load. The invention is especially applicable to such power supplies which incorporate a resonance circuit for supplying the load, such as an electronic ballast for an arcdischarge lamp.

Power supplies of this type normally have a full-wave rectifier supplied from the power line, and include an energy storage capacitor whose capacitance is sufficiently low that there is a significant ripple voltage at double the AC line frequency.

2. Description of the Prior Art

Electronic ballasts in common use all include a high frequency inverter, operated at a frequency high enough to minimize component size and improve lamp performance, yet not so high that radio noise becomes serious. Those intended for operation from a commercial AC power line usually include a full-wave rectifier, an energy storage capacitor from which the inverter is supplied, and a resonance circuit for connecting the lamps to the inverter. The earlier ballasts of this type had an electrolytic capacitor connected directly across the output of a full-wave bridge rectifier, which supplied 120 relatively short current pulses per second to the capacitor. As a result the line current had a very large harmonic current content. At the same time, the voltage across the energy storage capacitor had a relatively large ripple voltage which caused the amplitude of the high frequency lamp current to vary excessively, with a crest factor greater than 1.7.

In ballasts of this type the inverter frequency is usually not tightly controlled; commonly the inverter is þself-triggering" so that the frequency is relatively constant at a value around 30 kHz. To reduce the harmonic currents drawn from the power line, and improve the lamp crest factor, various DC boost circuits have been proposed, which involve taking high frequency power from the inverter, rectifying it and storing it, to help supply the inverter at least during periods of the input power line half cycle when the voltage is relatively low. These circuits have had the common property of being relatively complex and costly; for example, they often require a separate transformer winding, rectifier diodes, and an additional electrolytic capacitor. A different kind of boost circuit is shown in U.S. Pat. No. 5,001,400, which teaches use of a high-frequency-driven inductive-discharge "forward converter" to reduce power line current harmonic distortion.

Recently, to obtain circuit simplicity while still minimizing power line harmonics, connections have been proposed directly from the high frequency circuit to a node between the power line rectifier and an isolating diode through which all current to the energy storage capacitor flows.

U.S. Pat. No. 4,782,268 shows one such circuit. Circuit behavior is not easily described mathematically, but can be described qualitatively as follows: A relatively steady high voltage is maintained on main storage capacitor C4, and is converted into a high frequency square wave by an inverter formed by transistors T1 and T2. This high-frequency square wave is applied from a node M1 to the lamp circuit and to a coupling capacitor C7 which is connected to a node M2 between two diodes. These diodes are in series between the rectifier bridge and the storage capacitor C4, and are polarized in the direction of current flow from the rectifier bridge to the capacitor C4.

During a portion of the high-frequency cycle at node M1, the voltage at node M2 falls below the rectified power line voltage, and current flows from the bridge rectifier and input capacitor C2 through the diode D4 to coupling capacitor C7. Isolating diode D5 is a fast recovery diode which prevents current backflow from the main storage capacitor C4. During another portion of the high-frequency cycle at M1, the voltage at M2 rises above the voltage on the storage capacitor C4, and current flows from capacitor C7 through diode D5 to charge capacitor C4. When the power line voltage is near its peak, a large pulse of current is drawn through diodes D4 and D5, fully charging capacitor C4, as shown in FIGS. 4a and 4b. of the '268 patent. During this period there can be no significant high frequency current flow through capacitor C2.

A further capacitor C8, whose value is substantially smaller than C7, provides coupling from node M2 to the lamp circuit. The value of this capacitor is chosen to make the line current more sinusoidal.

This high-frequency charging circuit provides a great improvement over conventional capacitor-input filters, but still does not reduce line harmonics or lamp crest factor sufficiently. For example, to flatten the current spike shown in FIG. 4a, the patent teaches use of a relatively large 0.6 H line choke L2, producing the current waveform of FIG. 4b. To minimize harmonic line currents, operation at 25 to 50 kHz is suggested.

Still more recently, published PCT application WO 92/04808 discloses a ballast circuit for a compact fluorescent lamp which has an isolating diode similar to that in the '268 patent, but a different feedback connection. The lamp current circuit itself is connected between the inverter output and the node between the power line rectifier and the isolating diode. A capacitor C3, having a value about 0.047 $\mu$f, causes line current to be drawn during those portions of the input rectified voltage waveform when the rectified voltage is less than the voltage across the main storage capacitor. However, as shown in FIG. 4, the line current has a substantial spike near the peak of the voltage, when line current is being drawn directly as charging current for the main storage capacitor, so that line current still has an undesirably high harmonic content. The inverter is self-triggering, so there is no particular control of the inverter frequency.

Showing a different approach to control of electronic ballasts, U.S. Pat. No. 4,682,082 describes a circuit especially adapted for driving a neon lamp, in which the on and off periods of one of the transistors are controlled to be different. This invention minimizes a problem encountered with high frequency operation: the production of striations or bubbles in the gas plasma within the lamp.

When a main storage capacitor is placed directly across the output of a power line bridge rectifier, the value of this capacitor is a compromise. A very high capacitance produces a fairly low voltage ripple between charging pulses, but these pulses are sharp and generate very large line harmonic currents. A smaller capacitance reduces these harmonics, but the ripple voltage causes the lamp crest factor to become excessive.

As taught in U.S. Pat. No. 3,611,021, it was recognized at least as early as 1970 that the lamp current of an electronic-ballasted fluorescent lamp could be stabilized by sensing the lamp current, and varying the frequency of a ballast inverter in a direction to reduce the lamp current variation. In this circuit, the operating frequency is below the starting frequency, and frequency is reduced in order to decrease lamp current.

Lamp current variation can be particularly severe when a high frequency ballast is used with a high pressure gas discharge lamp. U.S. Pat. No. 4,471,269 teaches use of a relatively small ($\leq 1$ µf) storage capacitor, so that the high frequency lamp current would vary widely over the course of one half cycle of the power line voltage. To correct for this, the inverter switching frequency is modulated by comparing the instantaneous line current with the instantaneous line voltage, and using the difference signal to control the frequency of the inverter. The inverter frequency is raised to a peak when the line voltage is at its peak, and the inverter frequency is at its minimum when the line voltage is near crossover. Thus frequency is varied in direct proportion to rectifier output voltage.

U.S. Pat. No. 4,862,040 teaches use of a complex circuit and structure for modulating the inverter frequency of a fluorescent lamp ballast, to compensate for variations in lamp current which would result from ripple voltage on the storage capacitor. The inverter's output has a frequency averaging about 30 kHz. A complex saturable transformer varies the inverter frequency as a function of the instantaneous magnitude of the DC supply voltage to the inverter. Starting with an unmodulated frequency of about 25 kHz, for a ±30% ripple voltage the frequency averages about 30 kHz. This correction circuit raises the inverter frequency when the line voltage, and the DC bus voltage, are at their peak.

U.S. Pat. No. 4,873,471 teaches yet another technique for reducing the harmonic content of line current and the lamp crest factor. This relatively complex circuit does not contain a main energy storage capacitor. Rather, during approximately 2/3 of each half-cycle of power line frequency, the rectified sinusoid voltage is applied to the inverter circuit. The inverter frequency is varied approximately linearly with the voltage supplied to the inverter (high frequency at the high point of the line voltage), so that the lamp current remains approximately constant. During this same time, a make-up power source, containing a relatively large secondary storage capacitor, is charged from a bridge rectifier driven from a secondary winding on the inverter transformer. During the "inter-cusp period" of the rectified line voltage, the inverter draws power from the secondary storage capacitor, which has such a value that its voltage drops little during this period; and the inverter frequency remains relatively constant at its minimum value.

SUMMARY OF THE INVENTION

According to the invention, in an apparatus receiving power at lower frequency from an input which is full-wave rectified, a high frequency source is operated at a frequency which is controlled inversely responsive to the instantaneous value of the full-wave rectifier output voltage, the highest frequency occurring at line voltage crossover; and the load on the input power rectifier appears resistive when charging current is transferred by a frequency-sensitive coupling, at a high frequency rate, from the rectifier output to a storage element which supplies power to the high frequency source during part of each high frequency cycle. Circuit values are selected such that, during normal operation, power never flows directly from the rectified input to the storage element.

In a preferred embodiment, an electronic lamp ballast includes a high frequency inverter whose input power comes from a main storage capacitor which is isolated from the bridge rectifier. A resonant circuit, supplying current to the lamp, is coupled from the inverter to a circuit point between the main storage capacitor and the output of a full-wave bridge rectifier supplied from the low frequency (60 Hz) input. A capacitor in the resonant circuit alternately receives power from the bridge rectifier and delivers power to the storage capacitor at the high frequency rate. The inverter frequency is varied, at least in a ratio approximately 1.2:1, during the course of each half cycle of the low frequency input, in a direction opposite to the full-wave rectified voltage from the bridge rectifier, to minimize the lamp crest factor. In practical circuits, frequency variation in the range of approximately 1.4:1 to 1.6:1 may be preferred. In addition, the average frequency over a full low frequency cycle may be varied to compensate for variations in the low frequency input line voltage.

A low-cost electronic ballast for use with fluorescent lamps has a half-bridge transistor inverter connected across the main storage capacitor, and a series-tuned resonant circuit connected to the inverter junction for supplying lamp current. The aforementioned capacitor in the resonant circuit has a first terminal connected to one terminal of the storage capacitor, and a second terminal connected to an energy transfer node. An isolating diode is connected between the energy transfer node and the other terminal of the storage capacitor. The energy transfer node is connected, indirectly or directly, to the bridge rectifier, for transfer of power from the bridge rectifier in high frequency pulses.

The half-bridge inverter is operated at a modulated frequency above the resonant frequency of the series-tuned circuit. Unlike prior art electronic ballasts, with fixed inverter frequency the peak of the envelope of lamp current has been found to occur at the instant of line voltage crossover, rather than at the peak of the line voltage. The inverter is controlled from a voltage-controlled oscillator whose output frequency is varied according to a function of the instantaneous output voltage of the bridge rectifier; preferably, the frequency falls approximately linearly with rising rectifier output voltage, over a range of up to approximately 60% of the lowest frequency.

DESCRIPTION OF THE PREFERRED EMBODIMENT

Figure 1:
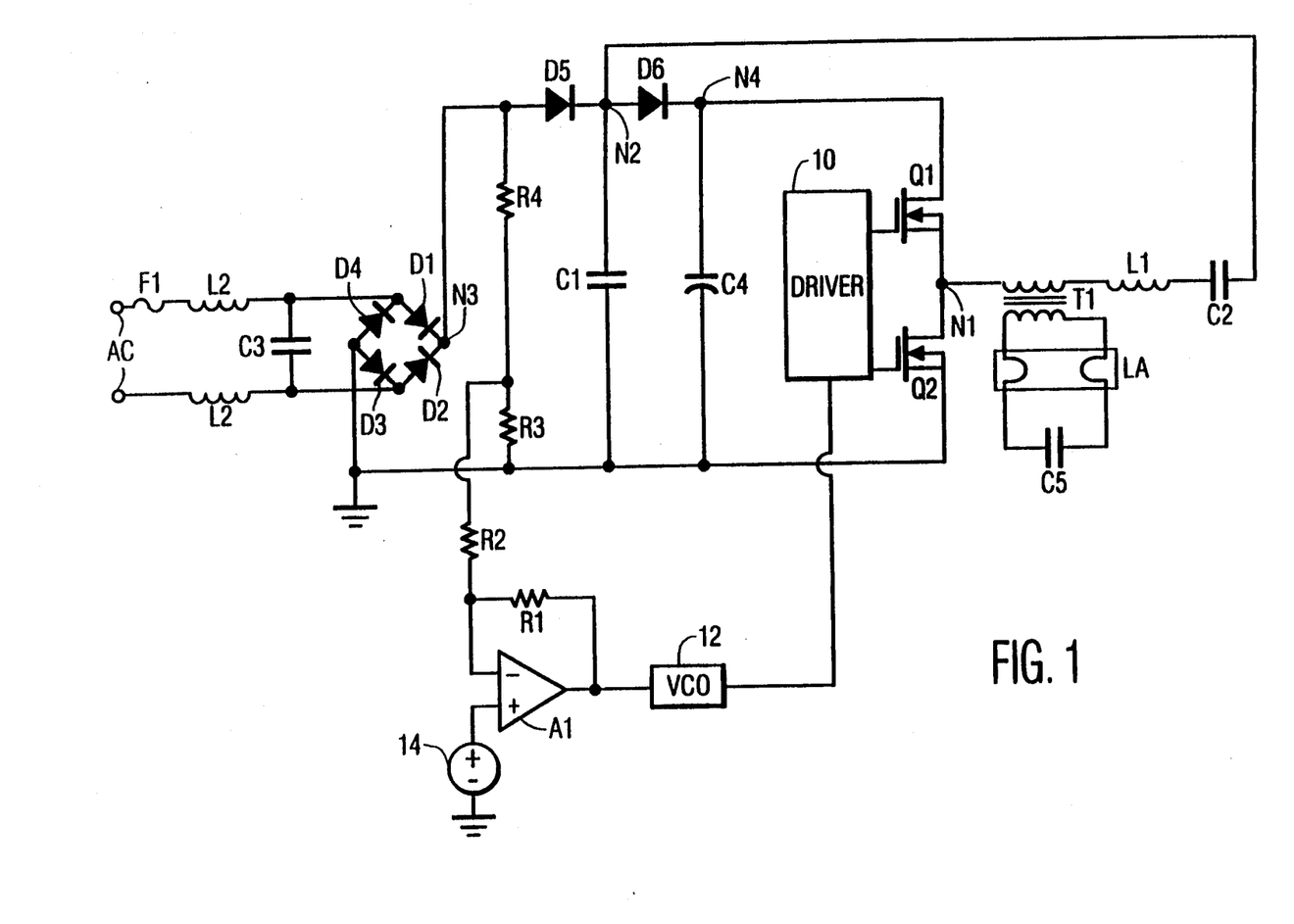
FIG. 1 is a simplified schematic drawing of an electronic lamp ballast according to the invention.

As shown in FIG. 1, a fluorescent lamp LA is energized from a high frequency half-bridge inverter formed by two transistors Q1 and Q2. The primary of a load transformer T1 is connected in series between the output node N1 of the inverter and a series resonant circuit formed by a choke L1 and a tuning of high frequency capacitor C1. The tuning capacitor C1 is connected between a node N2 in the power input section of the ballast, and the ground connection. A coupling capacitor C2 is connected in this series circuit, between the choke L1 and node N2.

The source of power for the ballast is an input AC, typically from a 120 V or 277 V, 60 Hz mains (line). The input line is connected to a conventional bridge rectifier D1–D4 through a fuse F1 and an interference filter formed by line chokes L2 and a capacitor C3. The bridge rectifier negative output is connected to the circuit ground, and the positive output defines a node N3 having voltage $V_{RECT}$ and is connected through a fast recovery diode D5 to the node N2. A second fast recovery diode D6 is connected between the node N2 and a node N4, which is the high voltage supply point for the inverter transistor Q1. A storage capacitor C4 is connected across the inverter power input, between node N4 and the circuit ground. The diodes D5 and D6, and the coupling from the tuned high frequency circuit to them, act together to provide energy transfer from the input line to the capacitor C4 at a high frequency rate, and produce an elevated DC input to the inverter as will be explained below. It is also clear that the tuning or high frequency capacitor C1 is in parallel with the series combination of the diode D6 and the storage capacitor C4.

The fluorescent lamp load is connected across the secondary of the transformer T1, and a conventional starting capacitor C5 is also connected to the lamp filaments.

The inverter is controlled by a driver circuit 10, which in turn is controlled by a high frequency signal from a voltage controlled oscillator 12 whose frequency is determined by the output of a differential amplifier A1. The amplifier A1 has its positive input connected to a reference voltage source 14, and has a feedback resistor R1 connected from its output to its negative input. The negative input is also connected by a resistor R2 to the junction of a voltage divider formed by resistors R3 and R4 connected across the output of the bridge rectifier. These polarities of connection cause the frequency to be at a maximum when the line is at crossover, and a minimum when the line voltage is at its peak.

Figure 1A:
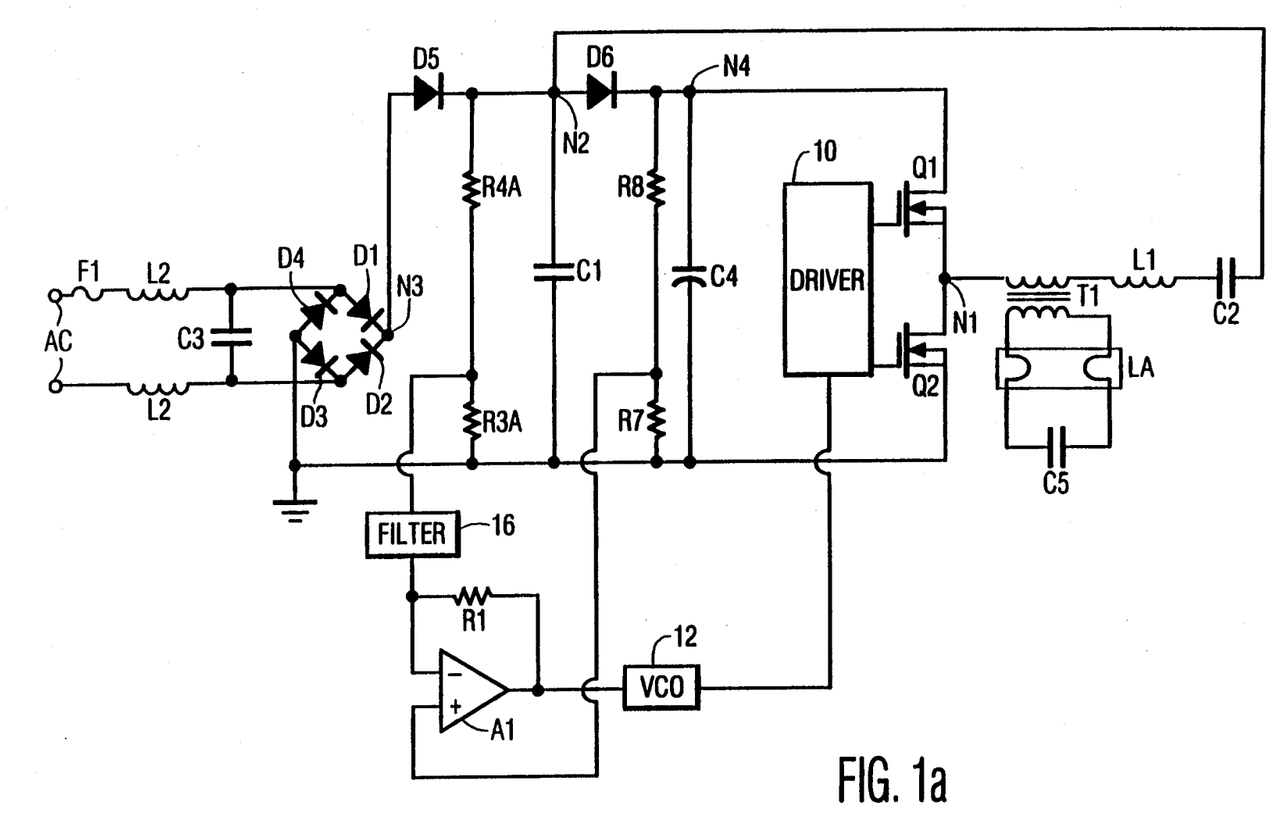
FIG. 1a is a simplified schematic drawing of a variation of the lamp ballast of FIG. 1.

In the circuit variation of FIG. 1a, the reference voltage source is preferably a selected fraction of the voltage across storage capacitor C4; that is, the voltage at node N4, and may be obtained from a simple voltage divider formed by resistors R7 and R8. Rather than sense the rectifier output waveform directly, at node N3, a voltage divider formed by resistors R3A and R4A is connected between node 2 and the circuit ground. As will be clear from the description below, to provide a signal which is the connected average of the voltage across capacitor C1 during each high frequency cycle, the signal is filtered in filter 16 before being supplied to the negative input of the amplifier A1.

Operation

The basic circuit of FIG. 1 is operable as described below, from different AC line voltages or frequencies, with different lamp loads, and at different inverter frequencies, by adjusting the component values as will be clear to those of ordinary skill in the electronic ballast art.

The inverter formed by transistors Q1 and Q2 is normally operated at a frequency above $1/(2\eta\sqrt{(L1 \cdot C1)})$ with a 50% duty cycle for each transistor. During startup, the frequency is swept downward toward the resonant frequency, as is well known. After the lamp has started, the high frequency current through the inductor L1 (also the primary of transformer T1), causes the voltage $v_{c1}$ at node N2 to rise and fall, once each cycle of lamp current, between limits shown in FIG. 2 related to the action of the diodes D5 and D6. The voltage $V_{c1}$ is the average voltage across C1 during an entire high frequency cycle; this varies as shown over the course of one line voltage cycle. The voltage $V_{c2}$ across the coupling capacitor varies little during the course of one high frequency cycle, but varies over the course of a line voltage cycle between half the peak line voltage $V_{pk}$, when the line is at its peak, and approximately zero when the line is near zero.

Figure 2:
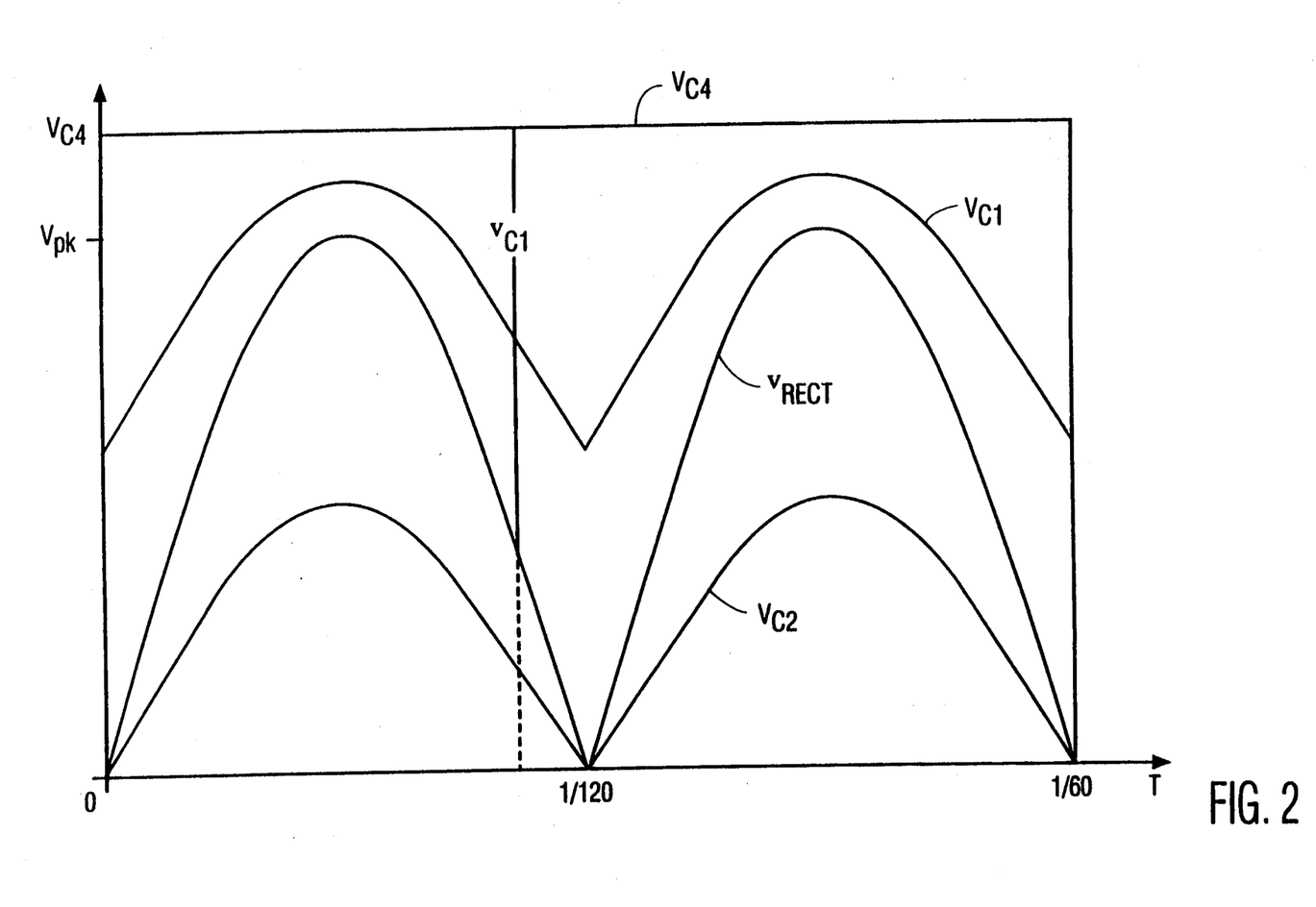
FIG. 2 is a graph showing variation of certain voltages over one input power line cycle.

Circuit behavior follows the cyclical pattern now to be described, except that, when the line voltage is near a zero crossing, there may be a difference in the instant in the high frequency cycle when the inductor current reaches its peak, and the period of time when charging current flows to capacitor C4 is delayed.

During a first stage of each high frequency cycle, immediately after transistor Q1 has switched on, because of the substantial inductance of inductor L1 current will still be flowing in a direction from node N2 to node N1. Q2 being switched off, current during this stage will flow in the "backwards" direction, through the reverse current diode which forms part of Q1, through C4 in a direction to charge C4, through the bridge rectifier and input power line (or filter), diode D5 and coupling capacitor C2. The absolute value of the inductor current now falls rapidly.

A certain period of time after transistor Q1 has been turned on, current through the inductor L1 reverses as the circuit enters the second stage of the high frequency cycle. The voltage at node N2 (which had been held by diode D5 at the then-existing instantaneous value of the rectified line voltage $V_{RECT}$) then starts to rise as capacitor C1 is charged. Capacitor C4 is now discharging through transistor Q1, and inductor L1 current rises at a rate determined by the voltage $V_{c2}$ across coupling capacitor C2 (which changes little during one high frequency cycle), the instantaneous difference in voltage ($V_{c4}-V_{c1}$) between the capacitors C1 and C4, the inductance L1 and the effective resistance of the lamp. After the node N2 voltage reaches the sum of the voltage $V_{c4}$ across the storage capacitor C4 plus the diode drop of D6, the circuit enters its third stage. The node 2 voltage remains constant, and no current flows through capacitor C4. Driven solely by the voltage across coupling capacitor C2, the still rising inductor current flows through diode D6.

In a fourth stage, immediately after the inverter switches, Q2 being on and Q1 off, the voltage driving the tank circuit is reversed because the voltage across capacitor C1 exceeds that across C2. Current is still flowing through diode D6, and will flow through capacitor C4 in a charging direction, but at a rapidly falling rate. When the lamp current reverses, the circuit enters the fifth stage. Diode D6 will cut off, and the voltage across C1 will start falling toward the then-existing rectified power line voltage. The reverse current will increase with a waveform similar to the previous positive current increase. No current flows through capacitor C4.

When $v_{c1}$ reaches the rectified line voltage less the forward drop of diode D5, the sixth stage is reached, and $v_{c1}$ remains constant. The inductor current then flows through transistor Q2, the bridge rectifier and the line or line filter, and through diode D5 and coupling capacitor C2. Immediately after the inverter again switches, and Q2 is turned off, this current will start to fall sharply as it flows through Q1, in a charging direction through C4, and through the bridge rectifier and diode D5, thus repeating stage 1 as described above.

The six different stages of one high frequency cycle are only partly symmetrical. The storage capacitor C4 receives charging current during the first and fourth stages, immediately following each switching of the inverter, but discharges only during stage two, when the voltage across capacitor C1 is being raised from the value where diode D5 was conducting to the value where diode D6 conducts.

As described above, the voltage $V_{c2}$ across capacitor C2 equals the difference between the average voltage $V_{c4}/2$ at node N1 and the average voltage $V_{c1}$ over the course of one high frequency cycle. $V_{c1}$ and $V_{c2}$ change greatly over the course of one half cycle of the power line voltage, and so does the magnitude of the excursion of the voltage $v_{c1}$ across capacitor C1 during a high frequency cycle, but $V_{c1}$ and $V_{c2}$ change in a direction opposite to the magnitude change. When the line voltage $V_{RECT}$ (and correspondingly $V_{c2}$) are quite low, shortly before the instant of inverter switching the voltage across the inductor and the effective load resistance may be so low that current through the inductor starts falling before the inverter switches. D5 conduction is delayed. This is consistent with the desire that line current waveform be identical to line voltage waveform. At the instant of line voltage crossover, the voltage $v_{c1}$ should reach its low limit (diode D5 is about to conduct) just as inductor current reaches zero.

When the component values and inverter frequency have been properly selected, the connected average of the current pulses through diode D5 match the bridge rectifier output voltage waveform. Except for the high frequency pulsation which is filtered by the interference filter, to the rectifier the ballast load looks like a pure resistance. Analysis shows that this requires that the value of storage capacitor C4 be sufficiently high that $V_{c4}$ does not change appreciably over the course of a line voltage cycle. It would seem that this should also cause the lamp crest factor to be a minimum, but the reverse is actually true. Both the waveform and the magnitude of inductor current change, in a complex fashion, as the rectifier output voltage changes over the course of one input voltage cycle. As a result, with a ballast operated as described so far, lamp crest factor will typically exceed 1.7.

With a constant inverter frequency at the exact value which makes the ballast look resistive, current through the lamp circuit never approaches zero, because capacitor C1 is charged and discharged between the power line rectifier output value $V_{RECT}$ and the voltage $V_{c4}$ across capacitor C4 once each high frequency cycle. The unexpected result is that the component of lamp current due to current through C1 (that is, current flowing during the second and fifth stages described) is maximum when the line voltage is zero, and minimum when the line voltage is at its peak. At the same time, the envelope of current through diode D5, at 120 Hz, is the same shape as the rectified line voltage.

Applicants have discovered that, in a ballast constructed and operated otherwise as above, by modulating the inverter frequency with a frequency excursion approximately inversely proportional to the voltage at node N3 (decreasing frequency with increasing voltage), the lamp current can be maintained essentially constant with no significant effect on line current harmonics. To achieve this result, it is necessary that the storage capacitor have sufficient capacitance that its voltage does not vary appreciably during one cycle of line voltage, and that the value of C1 be small enough that current flows through diode D5 only in response to the high frequency current.

In the preferred embodiment, the voltage divider R4/R3 provides a signal, through resistor R2, to the amplifier A1, which causes the inverter frequency to vary linearly with, but in the opposite direction to, the bridge rectifier output voltage. For a minimum frequency of about 56 kHz, maximum frequency may be about 80 to 85 kHz.

In general, to achieve this desired result, $C2 >> C1$; $C4 >> C2$; and $|Z_0| > |Z_{LA}|$, where $|Z_0| = \sqrt{(L1/C1)}$ and $|Z_{LA}|$ is the effective lamp impedance reflected to the primary side of transformer T1. An exemplary circuit used the following component values:

C1 47 nf
C2 330 nf
C3 470 nf
C4 87 µf
C5 4.7 nf
L1 0.15 mh
L2 800 µh
$|Z_{LA}|$ 23 Ω

The above analysis was all based on the assumption that the load is essentially linear. Thus, for a given input line voltage, the circuit values are correct to provide the desired power to a given load.

If the load is linear, and its power is permitted to vary according to the square of the input voltage level, a standard tolerance of ±10% on the line voltage will not affect line harmonics or lamp crest factor. When, according to accepted practice, the ballast control circuit compensates for changes in line voltage in order to maintain the average lamp power within acceptable limits, this compensation may cause the harmonic distortion of the line current to be greater than could otherwise be obtained. However, the overall performance of the lighting system is optimized by a compromise involving lamp life and efficiency, ballast cost, and line current waveform.

For example, the circuit of FIG. 1 may be modified in that the reference voltage source 14 is varied to maintain the average lamp power approximately constant. One technique for doing this uses the circuit variation of FIG. 1a.

Lamp crest factor and power variation due to line voltage fluctuation can be reduced by supplying the reference voltage source as a selected fraction of the node N4 voltage, as shown schematically in FIG. 1a. When a change in inverter frequency is maintained over a period of many line cycles, for example to compensate for a deviation in line voltage, the average ratio of component values to frequency and the voltage on the storage capacitor C4 no longer causes the inverter/load circuit to present a resistive equivalent load to the bridge rectifier; and the line current harmonics will rise somewhat. Although at the expense of a filter 16 to eliminate the high frequency components, sensing the voltage across capacitor C1, via resistors R3A and R4A, can optimize overall performance to prevent an excessive rise in the voltage across the storage capacitor C4 when a lamp has been removed, to control lamp current crest factor, or to affect lamp ignition timing. Frequency control may be based partly or completely on the voltage at node N2, filtered to remove the high frequency components.

In tests of a circuit like that of FIG. 1, lamp crest factor remained below 1.6 and line current total harmonic distortion remained below 15% for line voltage variations of ±10%. Without compensation for line voltage variation, line current total harmonic distortion was below 5%.

Figure 3:
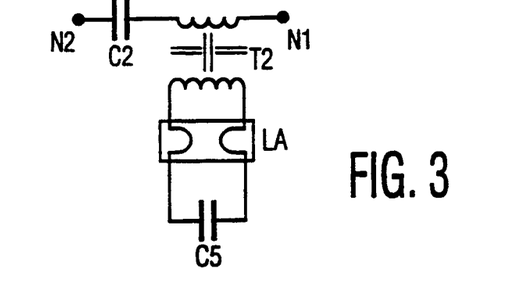
FIG. 3 is a partial schematic diagram of a variation of the circuit of FIG. 1 using a leaky transformer.
Figure 4:
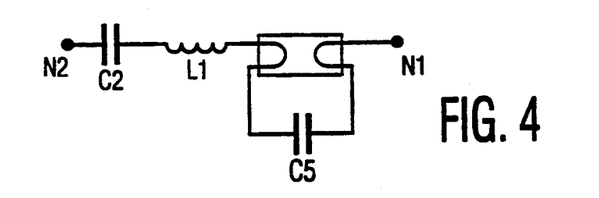
FIG. 4 is a partial schematic diagram of a variation of the circuit of FIG. 1 having a directly connected lamp.

It will be clear that many variations of the circuits shown can be used while obtaining the benefit of the invention. When used for a lamp ballast, more than one lamp may be driven, using well-known networks for providing starting voltage and/or filament power. As shown in FIG. 3, the choke L1 and transformer T1 can be combined into one leaky transformer T2, the balance of the circuit remaining the same. If the lamp and input AC have appropriately matched characteristics, the transformer can be completely eliminated, as shown in FIG. 4. The input filter, which prevents conduction of the inverter frequency and the RF switching transients on the input power line, can have many configurations. Part or all of the capacitance C3 can be connected from node N2 to the circuit ground, and a small capacitor can be placed directly across the line terminals, to form a balanced π section filter.

For another example, combined with the frequency modulation which minimizes line harmonic currents, the duty cycle of the inverter transistors may be made unequal, in order to provide lamp dimming.

If at least the diodes D1 and D2 are fast recovery diodes, diode D5 may be eliminated.

Figure 5:
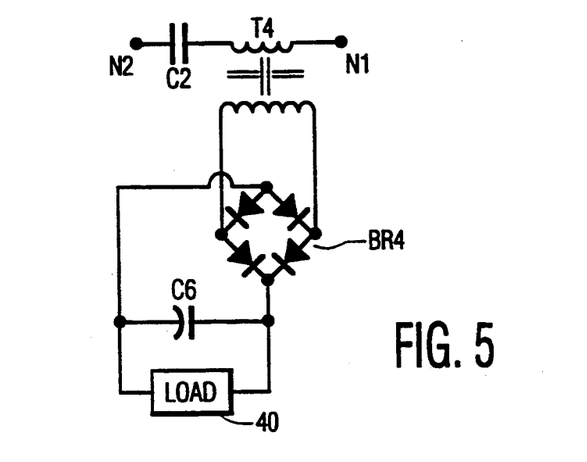
FIG. 5 is a partial schematic diagram of a power supply for an isolated load, similar to the circuit of FIG. 1 but using a leaky transformer.

The principle of the invention can also be applied to other applications besides lamp ballasts. For example, FIG. 5 shows an isolated DC power supply substituted for the lamp load. Leaky transformer T4 has a second bridge rectifier BR4 connected to its secondary. A smoothing capacitor C6 and a load 40 are connected to the DC output of the rectifier BR2. It will be clear that, in this application also, a choke in series with a transformer may be substituted for the leaky transformer T4.

Figure 6:
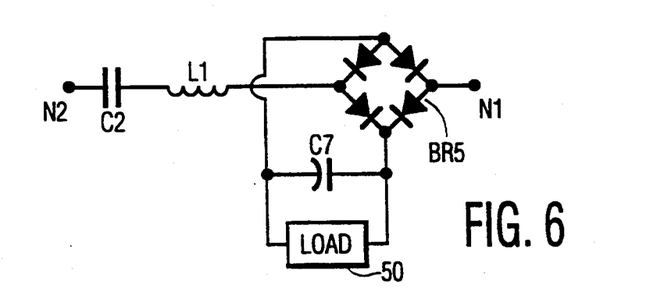
FIG. 6 is a partial schematic diagram of a variation of the circuit of FIG. 4 having a directly connected load.

FIG. 6 shows a non-isolated DC power supply having a bridge rectifier BR5 connected in series with choke L1 and coupling capacitor C2. Similar to the circuit of FIG. 5, a smoothing capacitor C7 and load 50 are connected to the DC output of the bridge rectifier BR5.

While the invention has been described with respect to a half-bridge inverter, other sources of high frequency signal may be substituted, which share the use of high frequency resonance coupling to a circuit point between the line rectifier and a main energy storage element, so that current is drawn from the power line or its filter at a frequency-modulated high frequency rate, and is supplied to the storage element at a corresponding rate rather than at a rate twice the input AC line frequency.

What is claimed is:

1. An electronic power supply for a high frequency load, comprising:
    a high frequency section providing high frequency load current to said load,
    a power input section receiving input power at a low AC frequency from a line, comprising a full-wave rectifier, an energy storage element, and an isolating element connected between the full-wave rectifier and the energy storage element, and
    a resonance circuit carrying said load current, connected to the high frequency section, and to the power input section between said isolating element and said energy storage element, for causing current to be drawn from said rectifier, and to be delivered to said energy storage element, only as high frequency current pulses,
    characterized by comprising means for sensing a full-wave rectified waveform of said low AC frequency to provide a sensed signal, and
    control means, responsive to said sensed signal, for frequency modulating the frequency of the load current during each cycle of the low frequency power input to minimize variations in the load current over each said cycle of the low frequency power input without substantial distortion of the low frequency current drawn by said power input section.

2. A power supply as claimed in claim 1, characterized in that current is drawn from said rectifier, and current is delivered to said energy storage element, only at mutually different periods of time in each high frequency cycle.

3. A power supply as claimed in claim 1, wherein said energy storage element is an energy storage capacitor having a capacitance sufficiently great that the voltage across it does not vary substantially during a cycle of the low frequency power input, said isolating element is a diode, said resonance circuit includes a capacitor having one terminal connected to a node between said diode and said energy storage capacitor and the other terminal connected to said energy storage capacitor, and said control means varies the frequency of said high frequency approximately linearly with but oppositely to the rectified voltage from said rectifier, the values of said capacitors and said high frequency being selected such that the voltage across said energy storage capacitor is greater than the peak voltage from said full-wave rectifier.

4. A power supply as claimed in claim 3, characterized in that current is drawn from said rectifier, and current is delivered to said energy storage element, only at mutually different periods of time in each high frequency cycle.

5. An electronic ballast for a gas discharge lamp, comprising
- input means for connecting to a source of low-frequency AC power,
- a full-wave rectifier circuit connected to said input means for providing a pulsating full-wave rectified supply voltage,
- an energy-storage capacitor connected to said supply voltage through an isolating diode,
- an inverter circuit connected to said energy-storage capacitor for providing high-frequency power at an inverter frequency,
- a resonance circuit comprising at least one inductance, one high frequency capacitor, and said lamp,
- means for connecting said high frequency capacitor in parallel with a series combination of said isolating diode and said energy-storage capacitor for supplying current pulsations to said energy-storage capacitor only at a frequency related to said inverter frequency, thereby to minimize harmonic currents from said source of low-frequency AC power,
- characterized by comprising means for sensing a full-wave rectified waveform of said low AC frequency to provide a sensed signal, and
- control means, responsive to said sensed signal, for frequency modulating the frequency of the lamp current during each half cycle of the low frequency power input to minimize variation of the lamp current drawn by said power input section.

6. A ballast as claimed in claim 5, characterized in that current is drawn from said full-wave rectifier circuit, and said current pulsations are supplied to said energy storage capacitor, only at mutually different periods of time in each high frequency cycle.

7. A ballast as claimed in claim 6, characterized in that said frequency of the lamp current is varied over a range greater than 1.2:1 during each half cycle of the low frequency power input.

8. A ballast as claimed in claim 6, characterized in that said frequency of the lamp current is varied over a range between approximately 1.4:1 and 1.6:1 during each half cycle of the low frequency power input.

9. A ballast as claimed in claim 6, characterized in that said frequency of the lamp current is varied as an approximately linear function of the full-wave rectifier voltage output during each half cycle of the low frequency power input, said frequency being reduced as said voltage output rises.

10. A ballast as claimed in claim 6, characterized in that said means for sensing a full-wave rectified waveform comprises means for sensing a voltage across said high frequency capacitor.

11. A ballast as claimed in claim 6, characterized in that said control means comprises a reference voltage source, the reference voltage being a predetermined fraction of the voltage across said energy storage capacitor.

12. A ballast as claimed in claim 11, characterized in that said means for sensing a full-wave rectified waveform comprises means for sensing a voltage across said high frequency capacitor, and means for filtering high frequency components from said voltage across said high frequency capacitor.

13. A ballast as claimed in claim 6, characterized in that said means for sensing a full-wave rectified waveform comprises means for sensing a voltage across said high frequency capacitor, and means for filtering high frequency components from said voltage across said high frequency capacitor.

14. An electronic ballast for a gas discharge lamp, comprising
- input means for connecting to a source of low-frequency AC power,
- a full-wave rectifier circuit connected to said input means for providing a pulsating full-wave rectified supply voltage,
- an energy-storage capacitor connected to said supply voltage through an isolating diode,
- a half-bridge inverter circuit connected to said energy-storage capacitor, having an output for providing high-frequency power at an inverter frequency,
- a resonance circuit connected to the inverter circuit output, comprising at least one inductance, one high frequency capacitor, and said lamp, and
- means for connecting said high frequency capacitor in parallel with a series combination of said isolating diode and said energy-storage capacitor for supplying current pulsations to said energy-storage capacitor only at a frequency related to said inverter frequency, current being drawn from said full-wave rectifier circuit, and said current pulsations being supplied to said energy storage capacitor, only at mutually different periods of time in each high frequency cycle, thereby to minimize harmonic currents from said source of low-frequency AC power,
- characterized by comprising means for sensing a full-wave rectified waveform of said low AC frequency to provide a sensed signal, and
- control means, responsive to said sensed signal, for frequency modulating the frequency of the lamp current over a range greater than 1.2:1 during each half cycle of the low frequency power input to minimize variation of the lamp current,
- said frequency of the lamp current being varied as an approximately linear function of the full-wave rectifier voltage output during each half cycle of the low frequency power input, said frequency being reduced as said voltage output rises.

15. A ballast as claimed in claim 14, characterized in that said control means comprises a reference voltage source, the reference voltage being a predetermined fraction of the voltage across said energy storage capacitor.

16. A ballast as claimed in claim 15, characterized in that said means for sensing a full-wave rectified waveform comprises means for sensing a voltage across said high frequency capacitor, and means for filtering high frequency components from said voltage across said high frequency capacitor.

17. A ballast as claimed in claim 16, characterized in that said frequency of the lamp current is varied over a range between approximately 1.4:1 and 1.6:1 during each half cycle of the low frequency power input.

18. A ballast as claimed in claim 15, characterized in that said frequency of the lamp current is varied over a range between approximately 1.4:1 and 1.6:1 during each half cycle of the low frequency power input.

19. A ballast as claimed in claim 14, characterized in that said frequency of the lamp current is varied over a range between approximately 1.4:1 and 1.6:1 during each half cycle of the low frequency power input.

* * * * *